US011333247B2

(12) United States Patent
Watanabe et al.

(10) Patent No.: US 11,333,247 B2
(45) Date of Patent: May 17, 2022

(54) METAL GASKET

(71) Applicant: NOK CORPORATION, Tokyo (JP)

(72) Inventors: Takeshi Watanabe, Fukushima (JP); Kazuya Aihara, Fukushima (JP); Isao Tanji, Fukushima (JP); Shinya Nakaoka, Fukushima (JP); Ryoko Saito, Fukushima (JP)

(73) Assignee: NOK CORPORATION, Tokyo (JP)

( * ) Notice: Subject to any disclaimer, the term of this patent is extended or adjusted under 35 U.S.C. 154(b) by 985 days.

(21) Appl. No.: 15/777,804

(22) PCT Filed: Nov. 25, 2016

(86) PCT No.: PCT/JP2016/084892
§ 371 (c)(1),
(2) Date: May 21, 2018

(87) PCT Pub. No.: WO2017/090702
PCT Pub. Date: Jun. 1, 2017

(65) Prior Publication Data
US 2018/0335142 A1    Nov. 22, 2018

(30) Foreign Application Priority Data

Nov. 27, 2015 (JP) .............................. JP2015-231912

(51) Int. Cl.
*F16J 15/08* (2006.01)
(52) U.S. Cl.
CPC ....... *F16J 15/0818* (2013.01); *F16J 15/0825* (2013.01)
(58) Field of Classification Search
CPC .......................... F16J 15/0818; F16J 15/0825
See application file for complete search history.

(56) References Cited

U.S. PATENT DOCUMENTS 4,834,399 A * 5/1989 Udagawa ............. F16J 15/0825
277/592
5,255,926 A * 10/1993 Udagawa ............. F16J 15/0825
277/595

(Continued)

FOREIGN PATENT DOCUMENTS

CN       103797286 A    5/2014
EP        1371884 A2   12/2003

(Continued)

OTHER PUBLICATIONS

International Search Report issued in WIPO Patent Application No. PCT/JP2016/084892, dated Feb. 7, 2017.

*Primary Examiner* — Christine M Mills
*Assistant Examiner* — L. Susmitha Koneru
(74) *Attorney, Agent, or Firm* — Greenblum & Bernstein, P.L.C.

(57) ABSTRACT

A metal gasket includes: a straight section provided with a bolt hole; a bead section raised from an inner peripheral edge of the straight section toward one side of the direction of the thickness of the gasket; and a bent section bent from an outer peripheral edge of the straight section toward the other side of the direction of the thickness of the gasket. When metal gasket is compressively sandwiched by a pair of housings, bead section elastically deforms to decrease height, and straight section elastically deforms, whereby the inner peripheral edge of the straight section contacts one of the housings, the outer peripheral edge of the straight section contacts the other housing, and the bent section contacts the one of the housings. A gasket installation determination projection is part of the periphery and provided on the outer peripheral edge of the bent section or of the straight section.

7 Claims, 11 Drawing Sheets

(56) References Cited

U.S. PATENT DOCUMENTS

| | | | | |
|---|---|---|---|---|
| 5,344,165 A | * | 9/1994 | Miyaoh | F16J 15/0825 |
| | | | | 277/595 |
| 5,906,376 A | * | 5/1999 | Udagawa | F16J 15/0818 |
| | | | | 277/595 |
| 6,406,032 B1 | * | 6/2002 | Miyaoh | F16J 15/0818 |
| | | | | 277/594 |
| 8,128,099 B2 | * | 3/2012 | Duckek | F16J 15/0825 |
| | | | | 277/594 |
| 9,121,489 B1 | | 9/2015 | Tosa et al. | |
| 2001/0045707 A1 | * | 11/2001 | Hegmann | F16J 15/14 |
| | | | | 277/591 |
| 2002/0140179 A1 | * | 10/2002 | Sadowski | F16J 15/0825 |
| | | | | 277/593 |
| 2003/0011139 A1 | * | 1/2003 | Miyaoh | F16J 15/0818 |
| | | | | 277/592 |
| 2003/0230858 A1 | | 12/2003 | Matsuki et al. | |
| 2006/0290072 A1 | | 12/2006 | Chen et al. | |
| 2007/0164518 A1 | * | 7/2007 | Imai | F16J 15/0825 |
| | | | | 277/594 |
| 2008/0237997 A1 | * | 10/2008 | Murata | F16J 15/0825 |
| | | | | 277/593 |
| 2009/0072493 A1 | * | 3/2009 | Duckek | F16J 15/0818 |
| | | | | 277/593 |
| 2009/0102138 A1 | * | 4/2009 | Hoehe | F16J 15/0818 |
| | | | | 277/595 |
| 2012/0153579 A1 | | 6/2012 | Nakaoka | |
| 2012/0319361 A1 | * | 12/2012 | Matsushita | B21D 39/032 |
| | | | | 277/598 |
| 2014/0090343 A1 | * | 4/2014 | Egloff | F16J 15/0825 |
| | | | | 55/487 |
| 2014/0203523 A1 | | 7/2014 | Anzai et al. | |
| 2018/0023705 A1 | * | 1/2018 | Watanabe | F16J 15/08 |
| | | | | 277/647 |

FOREIGN PATENT DOCUMENTS

| | | |
|---|---|---|
| JP | 54-27203 | 2/1979 |
| JP | 2004-19668 | 1/2004 |
| JP | 2013-61002 | 4/2013 |
| WO | 2011024812 | 3/2011 |

* cited by examiner

FIG. 9A
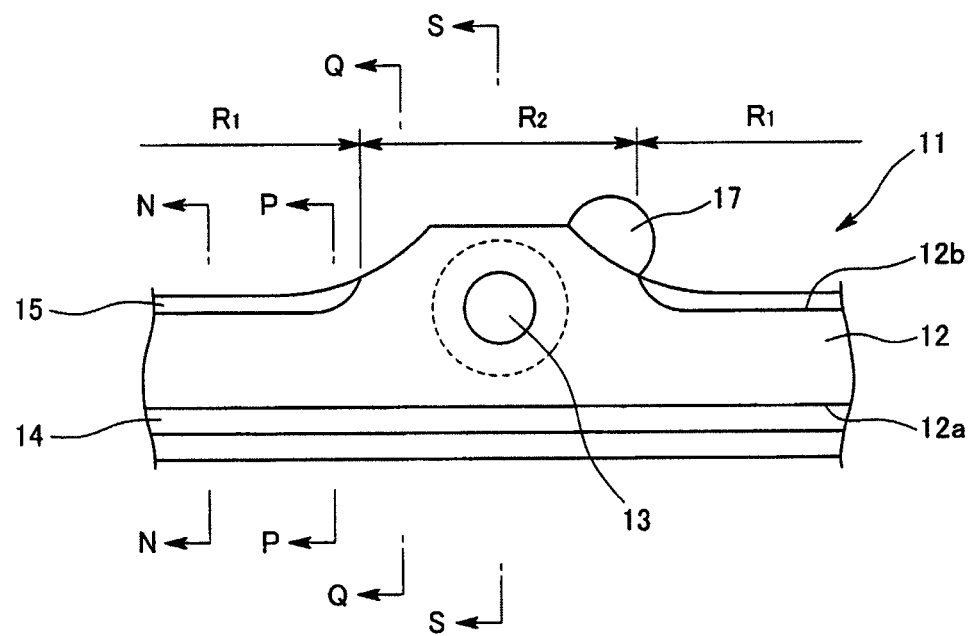
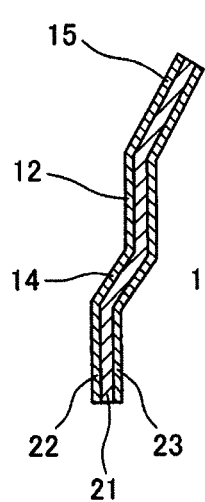
FIG. 9B
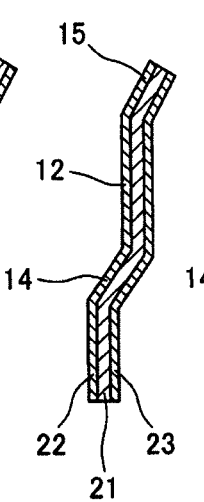
FIG. 9C
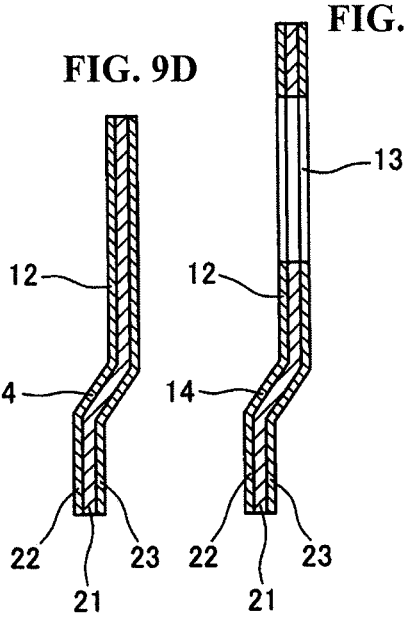
FIG. 9D
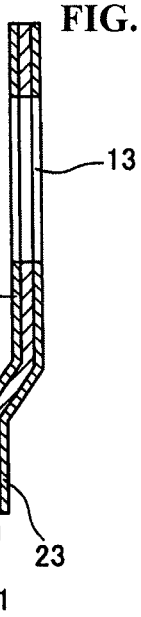
FIG. 9E

METAL GASKET

BACKGROUND OF THE INVENTION

Field of the Invention

The present invention relates to a gasket associated with a sealing technology and, more particularly, to a metallic flat metal gasket having a bead structure on a plane. The metal gasket in accordance with the present invention is used in, for example, an automobile-related field, and used especially in a place where an electronic component is stored inside a housing.

Description of the Conventional Art

A metal gasket used in, for example, the automobile-related field, is subjected to salt spray testing as a specification evaluation item in some cases (especially in a case where an electronic component or the like is placed inside a housing) so as to prepare for a situation in which an automobile is driven in an area, such as a seaside area or in a cold area where a snow melting agent is spread. In this case, if a counterpart enclosure (housing) to which the metal gasket is to be installed is made of an aluminum alloy (ADC12 or the like), then the salt water retained in (adhered to) the crevice between the metal gasket and the housing is repeatedly dried and wetted, causing the aluminum alloy to be corroded (crevice corrosion) by the salt water (the difference in ion concentration). The metal gasket exerts its sealing function by the reaction force of a bead structure in contact with the housing. If the corroded portion of the housing passes the sealing line having the bead structure, then the sealing function is impaired. Although a housing made of a ferrous material will also develop the corrosion, aluminum is especially apt to develop corrosion because of its higher ionization tendency.

FIG. 10(A) illustrates a metal gasket 51 according to a conventional example. Integrally provided with the metal gasket 51 are a planar straight section 52 and a bead section 53 provided on the inner peripheral side (the right side in the drawing) of the straight section 52. FIG. 10(B) illustrates a state in which the metal gasket 51 has been elastically deformed after being sandwiched between a pair of housings 61 and 62. At this time, as illustrated in the drawing, a sectional wedge-shaped crevice "c" opened to an outside of the housings "O" is formed between the straight section 52 and one housing (the lower housing in the drawing) 61. Thus, the salt water (not illustrated) from the outside of the housings "O" enters into the crevice "c," causing the corrosion (crevice corrosion) to take place on a plane of the housing 61. If a corroded part F passes a sealing line SL, then the sealing function is impaired.

The applicant of the present invention has previously proposed a metal gasket 51 illustrated in FIG. 11(A) in order to suppress the degradation of the sealing function attributable to the corrosion of the housing 61 (refer to Patent Document 1).

However, the metal gasket 51 illustrated in FIG. 11(A) has a bead section 53 on the inner peripheral side (the right side in the drawing) of a straight section 52, and a bent section 54 on the outer peripheral side (the left side in the drawing) of the straight section 52, and a distal end portion 54a of the bent section 54 comes in contact with one housing 61 when the metal gasket 51 is sandwiched between a pair of housings 61 and 62 and elastically deformed as illustrated in FIG. 11(B), thus closing a crevice "c" between the straight section 52 and the housing 61. This prevents salt water (not illustrated) from an outside of the housings "O" from entering into the crevice "c," thus making it possible to restrain the degradation of the sealing function caused by the occurrence of corrosion of the housing 61.

PRIOR ART DOCUMENTS

Patent Documents

Patent Document 1: Japanese Unexamined Patent Publication No. 2013-61002

SUMMARY OF THE INVENTION

Problem to be Solved by the Invention

The metal gasket 51 illustrated in FIGS. 11(A) and 11(B) has the bead section 53 provided on the inner peripheral side of the straight section 52 and the bent section 54 provided on the outer peripheral side of the straight section 52 as described above, and the crevice "c" between the straight section 52 and the housing 61 is closed by the bent section 54, thus making it possible to restrain the degradation of the sealing function due to the corrosion of the housing 61 so as to exert high sealing performance. If the metal gasket 51 is further provided with a gasket installation determination function, then the performance of the gasket can be significantly improved. The gasket installation determination function added to the metal gasket 51 would make it possible to visually check from outside an installation place that the gasket 51 has been installed to the installation place, thus enabling the prevention of the installation being forgotten. Further, in recent years, there has been a high demand for downsizing (making smaller and lighter) an equipment unit using this type of gasket, so that the gasket installation determination function is desirably added to a gasket without ignoring the demand for downsizing.

In view of the circumstances described above, an object of the present invention is to add a gasket installation determination function to a metal gasket provided with a bead section on the inner peripheral side of a straight section and a bent section on the outer peripheral side of the straight section in order to restrain the degradation of a sealing function caused by the corrosion of a housing.

Means for Solving the Problem

To this end, a metal gasket in accordance with the present invention is a metal gasket to be sandwiched between a pair of housings, the metal gasket including: a straight section provided with a bolt hole; a bead section formed by being raised from an inner peripheral edge of the straight section toward one side in the direction of the thickness of the gasket; and a bent section formed by being bent from an outer peripheral edge of the straight section toward the other side in the direction of the thickness of the gasket, wherein, in the case where the metal gasket is compressively sandwiched by the pair of housings, the bead section elastically deforms such that the height thereof decreases, and the straight section also elastically deforms. At this time, the inner peripheral edge of the straight section comes in contact with one of the housings, the outer peripheral edge of the straight section comes in contact with the other housing, and the bent section comes in contact with the one of the housings. A gasket installation determination projection, which is a part of a periphery, is provided on an outer peripheral edge of the metal gasket, which is an outer peripheral edge of the bent section or the outer peripheral edge of the straight section.

In the metal gasket in accordance with the present invention having the foregoing configuration, the bead section is provided on the inner peripheral side of the straight section and the bent section is provided on the outer peripheral side of the straight section. In addition, the gasket installation determination projection, which is a part of the periphery, is provided on the outer peripheral edge of the metal gasket, which is the outer peripheral edge of the bent section or the outer peripheral edge of the straight section, and the gasket installation determination projection is disposed, protruding from an installation space between the pair of housings to the outer side on the plane. Hence, the projection can be visually checked for the presence thereof from outside the housings, and checking the presence of the projection in this manner makes it possible to visually check from outside an installation place that the gasket has been installed to the installation place (if the projection is visually recognized, then it can be known that the gasket has been installed, or if the projection is not visually recognized, then it can be known that the gasket has not been installed).

The aspect described below can be considered as the configuration for providing the gasket installation determination projection on the outer peripheral edge of a metal gasket provided with a bead section on the inner peripheral side of a straight section and a bent section on the outer peripheral side of the straight section.

(1) The bent section is provided on the outer peripheral edge of the straight section, and the gasket installation determination projection, which is a part of the periphery, is provided on the outer peripheral edge of the bent section.

(2) The bent section is provided on the outer peripheral edge of the straight section, a second straight section is provided on the outer peripheral edge of the bent section, and the gasket installation determination projection, which is a part of the periphery, is provided on the outer peripheral edge of the second straight section.

(3) The bent section is provided on a part of the periphery of the outer peripheral edge of the straight section thereby to provide, on the outer peripheral edge of the metal gasket, an area in which the bent section is provided and an area in which no bent section is provided. Further, in the latter area having no bent section, the gasket installation determination projection, which is a part of the periphery, is provided on the outer peripheral edge of the straight section.

(4) The gasket installation determination projection may be provided at a position on the outer peripheral side of the bolt hole or a position in the vicinity thereof, or a position between bolt holes that are adjacent to each other (an inter-bolt-hole position). According to the present invention, therefore, the gasket installation determination projection can be provided at any position of the outer peripheral section of the gasket, thus enabling the gasket installation determination projection to be provided while preventing a spacing conflict relative to adjacent components. For example, when the gasket installation determination projection is provided at a position between the bolt holes and if the gasket installation determination projection inconveniently interferes with an adjacent component, then the gasket installation determination projection can be provided at a position on the outer peripheral side of the bolt holes or at a position in the vicinity thereof so as to make it possible to avoid the interference with the adjacent component. Thus, the present invention can contribute to meeting the demand for downsizing equipment in recent years.

(5) The gasket installation determination projection may be provided as a projection directed parallel to the straight section or as a projection directed parallel to the bent section.

The metal gasket, as a whole, may be a metal-only gasket composed only of a metal plate. Alternatively, however, the gasket may be a laminated type metal gasket having a rubber layer attached to the surface of a metal plate. In this case, the rubber layer comes in contact with a housing to which the gasket is to be installed, so that the sealing effect can be expected to be exerted by the rubber layer.

Effect of the Invention

The present invention makes it possible to add a gasket installation determination function to a metal gasket provided with a bead section on the inner peripheral side of a straight section to restrain the degradation of the sealing function caused by the corrosion of a housing and also provided with a bent section on the outer peripheral side of the straight section, thus enabling the performance of the gasket to be significantly improved.

BRIEF EXPLANATION OF THE DRAWINGS

FIGS. 9A, 9B, 9C, 9D and 9E present diagrams illustrating another example of the bead structure provided in the gasket, FIG. 9A being a plan view of an essential section of a metal gasket, FIG. 9B being an enlarged cross-sectional view taken on line N-N in FIG. 9A, FIG. 9C being an enlarged cross-sectional view taken on line P-P in FIG. 9A, FIG. 9(D) being an enlarged cross-sectional view taken on line Q-Q in FIG. 9A, and FIG. 9E being an enlarged cross-sectional view taken on line S-S in FIG. 9A;

DETAILED DESCRIPTION OF PREFERRED EMBODIMENTS

The following will describe embodiments of the present invention with reference to the accompanying drawings.

First Embodiment

Figure 1:
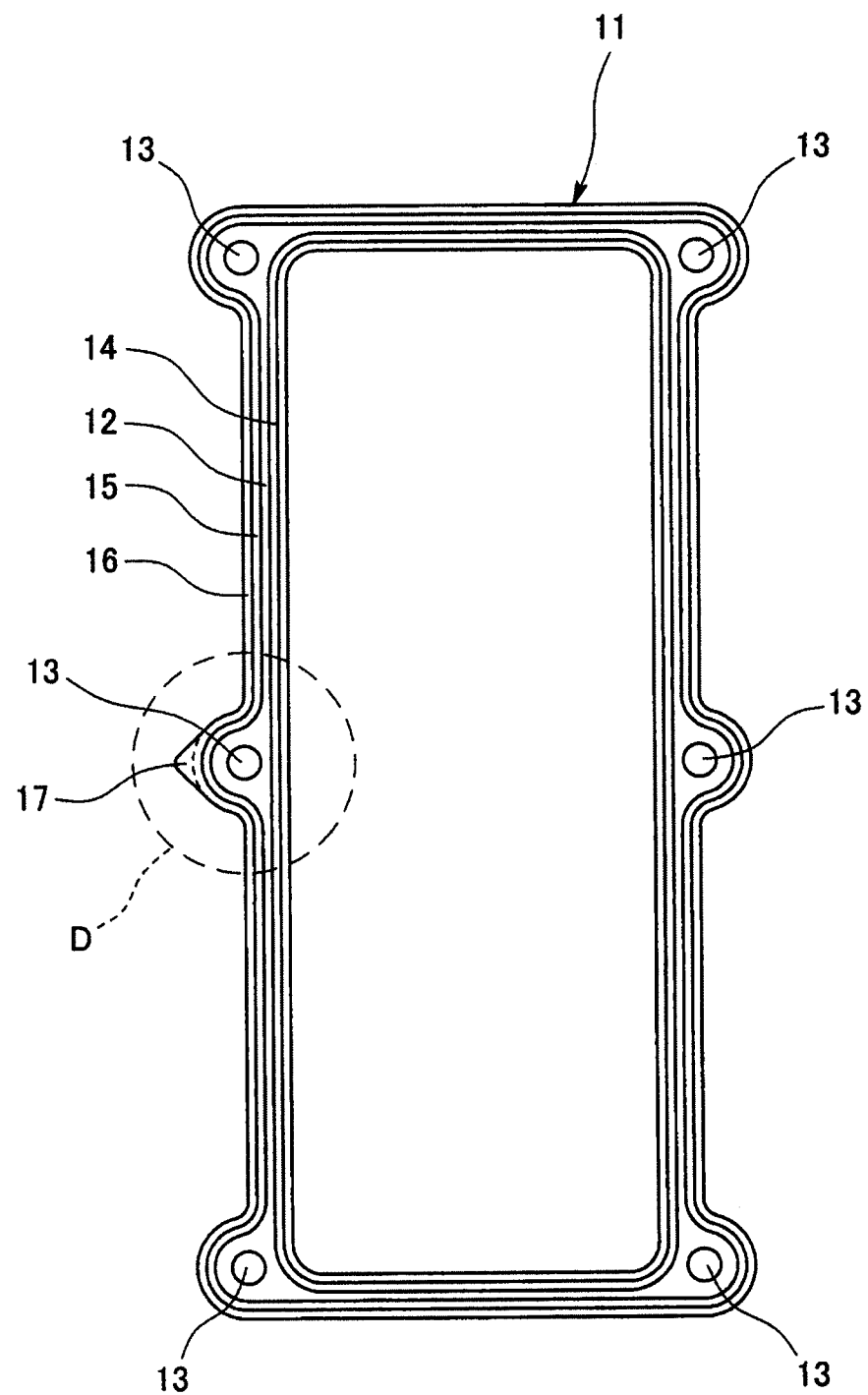
FIG. 1 is a plan view of a metal gasket according to a first embodiment of the present invention.
Figure 2:
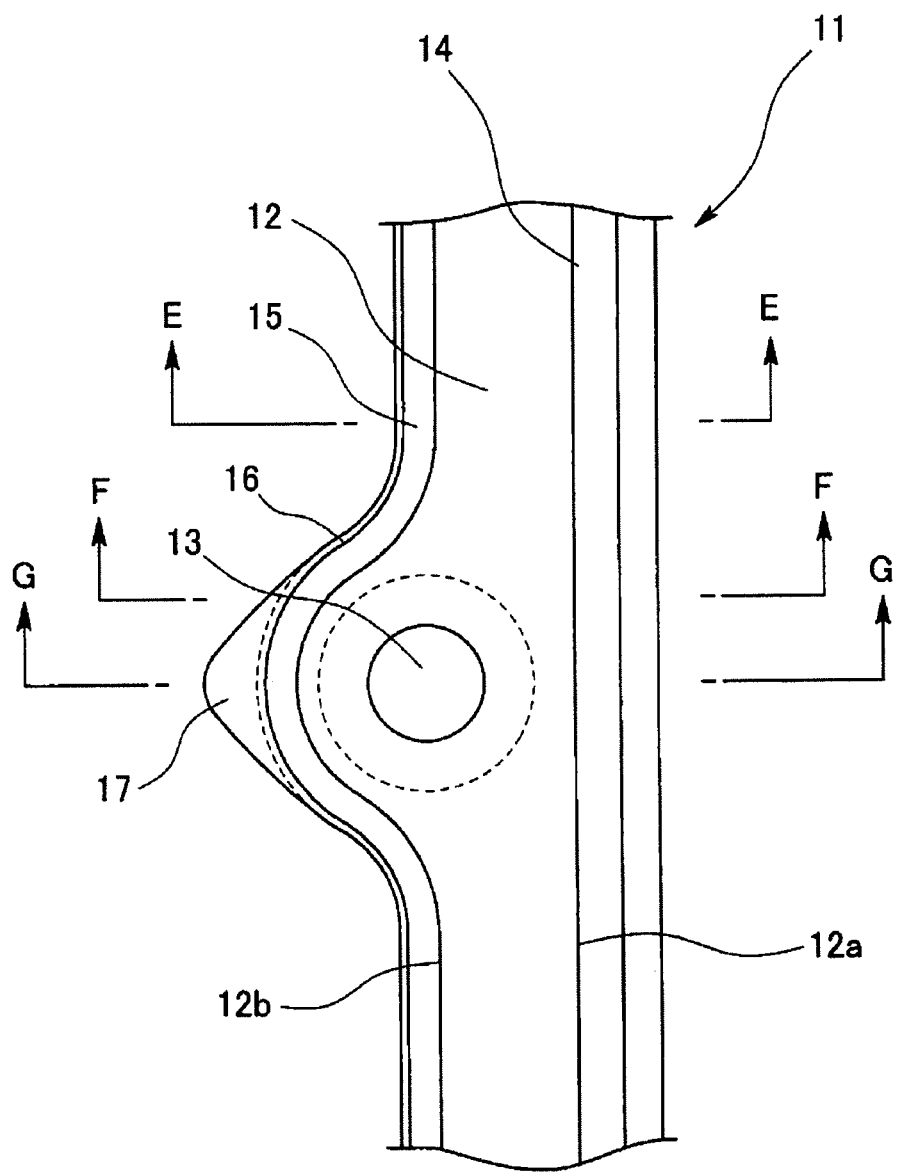
FIG. 2 is a plan view of an essential section of the gasket, and is also an enlarged view of a portion D in FIG. 1.
Figure 3A:
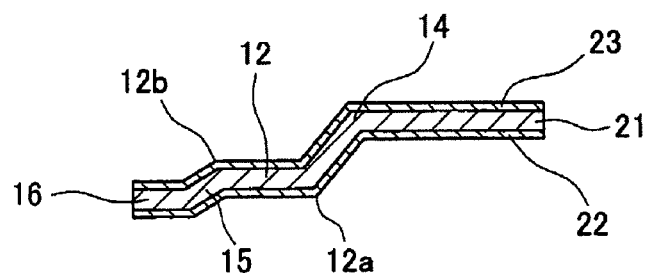
FIGS. 3A, 3B and 3C present cross-sectional views of the essential section of the gasket, FIG. 3A being an enlarged cross-sectional view taken on line E-E in FIG. 2, FIG. 3B being an enlarged cross-sectional view taken on line F-F in FIG. 2, and FIG. 3C being an enlarged cross-sectional view taken on line G-G in FIG. 2.
Figure 3B:
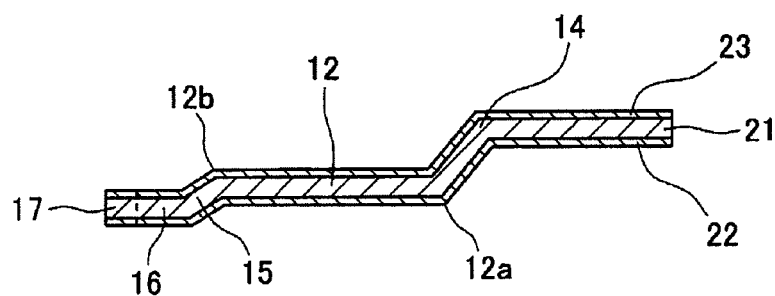
Figure 3C:
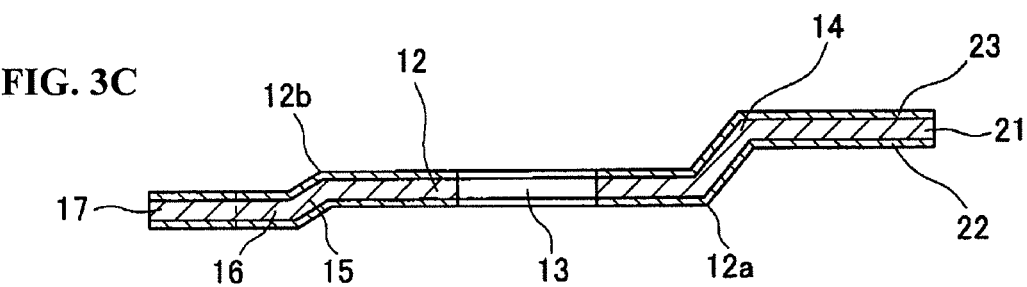

FIG. 1 to FIG. 3 illustrate a metal gasket 11 according to an embodiment of the present invention. As illustrated in FIG. 1, the metal gasket 11 according to the embodiment is a metallic flat gasket formed to have a shape like a planar rectangular frame.

As illustrated by the enlarged views of FIG. 2 and FIG. 3, the metal gasket 11 has a planar straight section (planar section) 12 provided with, in the plane thereof, a predetermined number of bolt holes 13 in which assembly bolts 63 (refer to FIG. 4) are to be inserted, a bead section 14 having a half bead shape is integrally formed aslant toward one side (upward in each view of FIG. 3) of the direction of the gasket thickness from an inner peripheral edge 12a of the straight section 12, and a bent section (outer peripheral bent section) 15 having a skirt-like shape is integrally formed aslant toward the other side (downward in each view of FIG. 3) of the direction of the gasket thickness from an outer peripheral edge 12b of the straight section 12. All these straight section 12, the bead section 14, and the bent section 15 are provided along the entire periphery of the gasket 11.

Further, a second straight section 16 is integrally formed on the outer peripheral side of the bent section 15, and a gasket installation determination projection 17 is integrally formed further on the outer peripheral side of the second straight section 16. The second straight section 16 is provided along the entire periphery of the gasket 11, and provided parallel to the straight section 12. On the other hand, the gasket installation determination projection 17 is provided only on a part of the periphery of the gasket 11 and is provided on the same plane as the second straight section 16. Further, the gasket installation determination projection 17 is provided as a projection shaped like a flat tongue piece on the outer peripheral side of the bolt hole 13.

The bead section 14 provided on the inner peripheral side of the straight section 12, the bent section 15 provided on the outer peripheral side of the straight section 12, the second straight section 16, and the gasket installation determination projection 17 can be simultaneously formed by press working or the like.

Further, as illustrated in the diagrams of FIG. 3, the metal gasket 11 has a metal plate (steel plate layer) 21, and rubber layers (surface rubber layers) 22 and 23 are attached (bonded) to both entire surfaces of the metal plate 21 in the direction of the thickness of the metal plate 21. Thus, the metal gasket 11 is a laminated type metal gasket (rubber-coated metal gasket) composed of the combination of the metal plate 21 with the rubber layers 22 and 23 attached to the surfaces of the metal plate 21, and the rubber layers 22 and 23.

Figure 4:
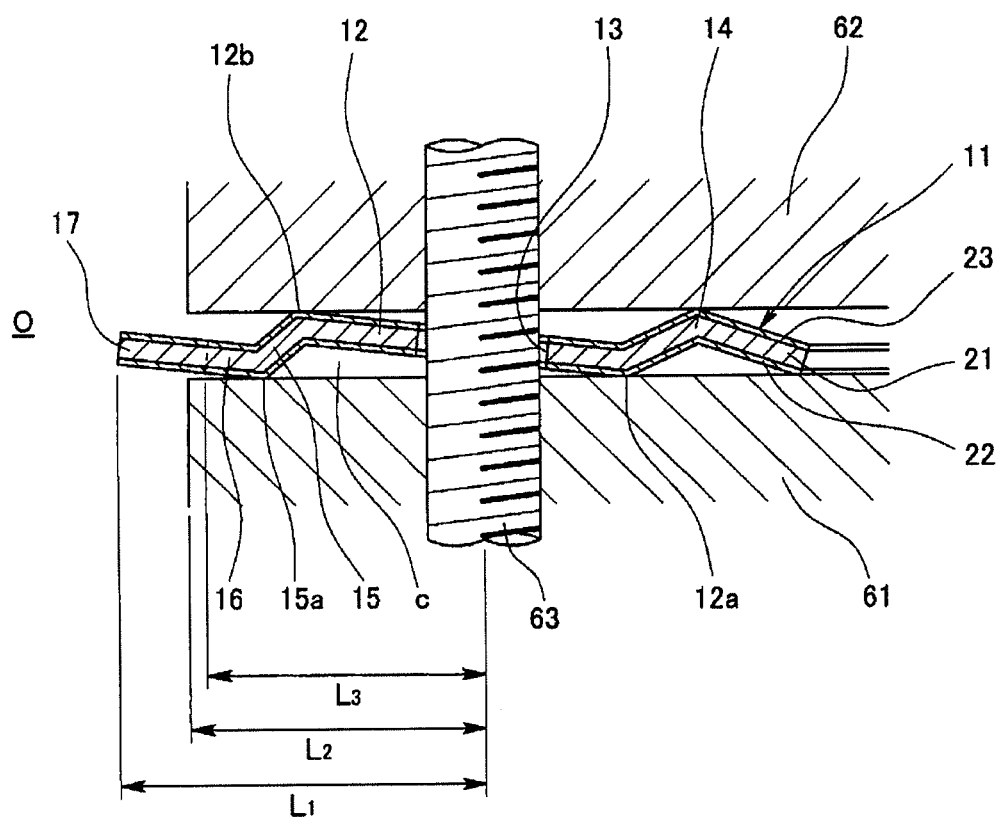
FIG. 4 is a cross-sectional view of an essential section, illustrating a state in which the gasket has been installed.

The metal gasket 11 having the foregoing configuration is used by being sandwiched between a pair of housings, and exerts the sealing effect between the pair of housings. If the material of the housings is an aluminum alloy (ADC12 or the like), then the housings tend to develop crevice corrosion. Under such circumstances, the metal gasket 11 having the foregoing configuration is placed, in the initial placement of the metal gasket 11 before being compressively sandwiched by the pair of housings, such that the bent section 15 faces one housing and the bead section 14 faces the other housing. Thereafter, the gasket 11 is compressively sandwiched in the thickness direction by the pair of housings so as to be clamped as illustrated in FIG. 4. More specifically, the bead section 14 having the half bead shape elastically deforms such that the height thereof decreases, and the straight section 12 elastically deforms aslant accordingly. At this time, the inner peripheral edge 12a of the straight section 12 comes in contact with the one housing 61, while the outer peripheral edge 12b thereof comes in contact with the other housing 62, and an outer peripheral edge 15a of the bent section 15 comes in contact with the one housing 61. Thus, the bent section 15 comes in contact with the one housing 61, so that a sectional wedge-shaped crevice "c" between the straight section 12 and the one housing 61 is closed. This minimizes the possibility of the salt water (not illustrated) entering into the crevice "c" from the outside of the housings "O," thus making it possible to restrain the occurrence of the crevice corrosion of the housing 61 with consequent degradation of the sealing function. The crevice "c" may be filled with grease. A grease may be charged in the crevice "c," and filling the crevice "c" with a grease further enhances the resistance to the occurrence of the crevice corrosion.

In addition to the above, in the metal gasket 11 having the foregoing configuration, the second straight section 16 is provided on the outer peripheral side of the bent section 15, and the gasket installation determination projection 17, which is a part of the periphery, is provided on the further outer peripheral side of the second straight section 16 and is provided on the same plane. This arrangement enables the gasket installation determination projection 17 to be placed to project toward the outside of the housings "O" from the installation space between the pair of housings 61 and 62, as illustrated in FIG. 4. Hence, the projection 17 can be visually checked for its presence from outside of the housings 61 and 62, thus making it possible to visually check from the outside of the installation place that the gasket 11 has been installed to the installation place by checking the presence of the projection 17 as described above. This enables the gasket 11 to have the gasket installation determination function.

To place the gasket installation determination projection 17 such that the projection 17 projects toward the outside of the housings "O" from the installation space between the pair of housings 61 and 62, a relationship denoted by $L_1 > L_2$ is to be set, the length (distance) from the center of the bolt hole 13 to the distal end of the projection 17 being denoted by $L_1$, and the length (distance) from the center of the bolt hole 13 to the edges of the housings 61 and 62 being denoted by $L_2$, as illustrated in FIG. 4.

Further, to have only the gasket installation determination projection 17 project toward the outside of the housings "O" from the installation space between the pair of housings 61 and 62 while preventing the second straight section 16 from projecting, a relationship denoted by $L_1 > L_2 \geq L_3$ is to be set, the length (distance) from the center of the bolt hole 13 to the distal end of the projection 17 being denoted by $L_1$, the length (distance) from the center of the bolt hole 13 to the edges of the housings 61 and 62 being denoted by $L_2$, and the length (distance) from the center of the bolt hole 13 to the outer peripheral edge of the second straight section 16 being denoted by $L_3$.

Figure 11A:
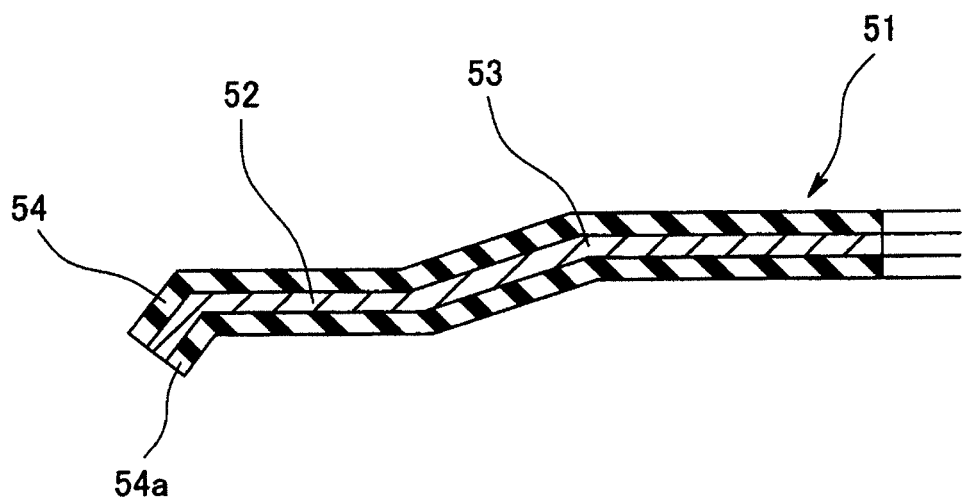
FIGS. 11A and 11B present diagrams illustrating a metal gasket according to a prior art, FIG. 11A being a cross-sectional view of an essential section of the gasket, and FIG. 11B being a cross-sectional view illustrating the essential section in a state in which the gasket has been installed.
Figure 11B:
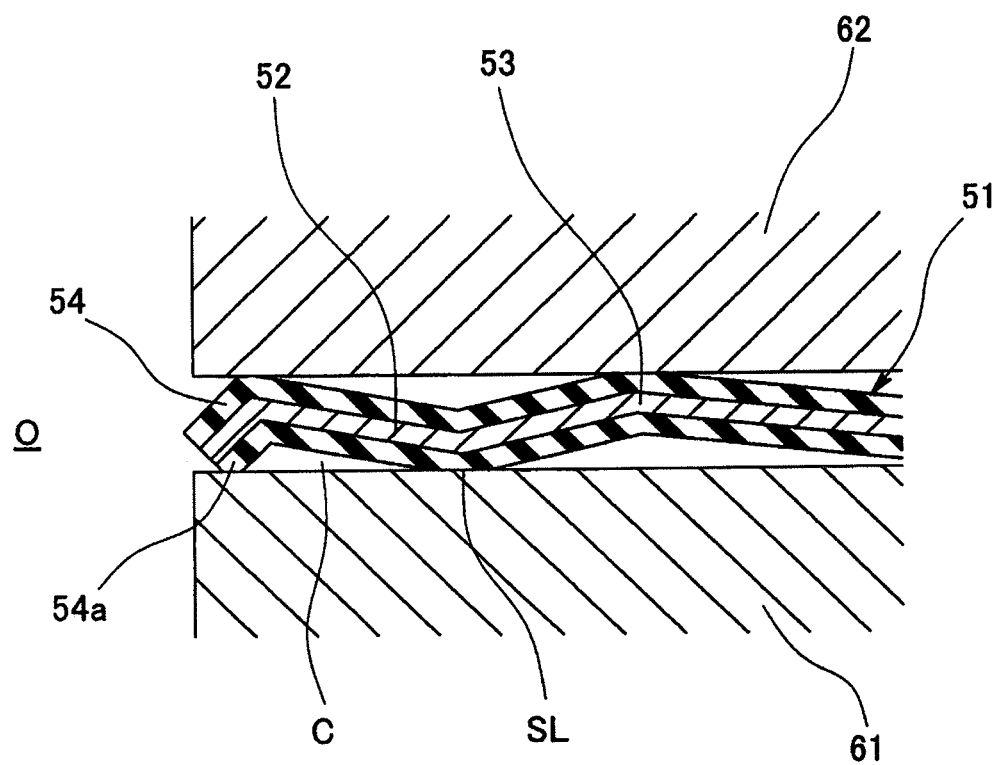

The metal gasket 51 according to the prior art illustrated in FIG. 11 described above is provided with the bent section 54 on the outer peripheral side of the straight section 52. Therefore, the gasket installation determination projection could be provided directly on the outer peripheral side of the bent section 54. However, if the gasket installation determination projection is provided on the outer peripheral side of the bent section 54 and on the same plane as the bent section 54, then the gasket installation determination projection will interfere with the one housing 61, thus preventing the gasket 51 from being properly sandwiched in some cases.

To prevent such a problem, therefore, the second straight section 16 is interposed between the bent section 15 and the gasket installation determination projection 17 in the present embodiment. With this arrangement, due to the interposition of the second straight section 16, the projecting direction of the gasket installation determination projection 17 is changed, so that the gasket installation determination projection 17 does not interfere with the one housing 61, thus enabling the gasket 11 to be properly sandwiched.

Figure 5A:
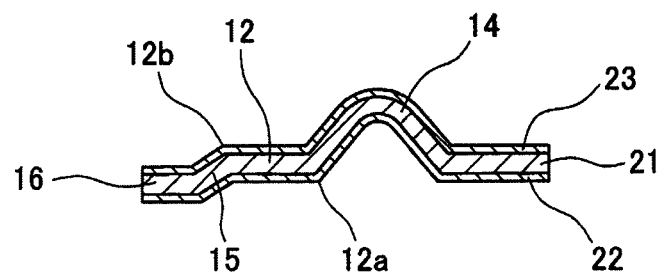
FIGS. 5A, 5B and 5C present diagrams illustrating another example of a bead structure provided in the gasket, FIG. 5A being a cross-sectional view corresponding to the enlarged cross-section taken on line E-E in FIG. 2, FIG. 5B being a cross-sectional view corresponding to the enlarged cross-section taken on line F-F in FIG. 2, and FIG. 5C being a cross-sectional view corresponding to the enlarged cross-section taken on line G-G in FIG. 2.
Figure 5B:
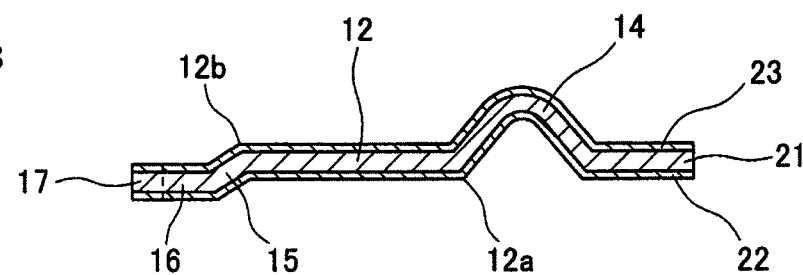
Figure 5C:
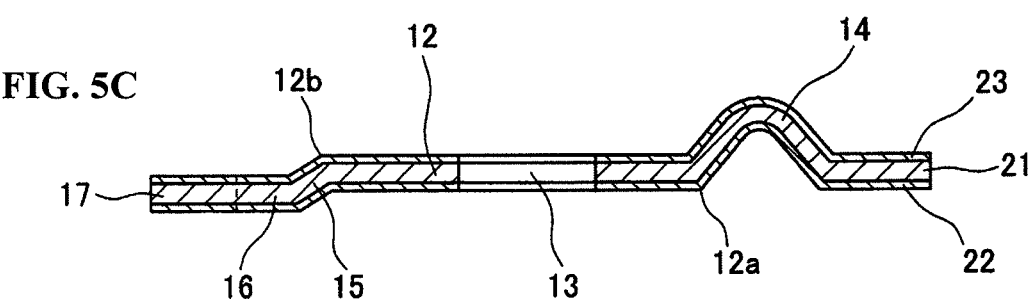
Figure 6:
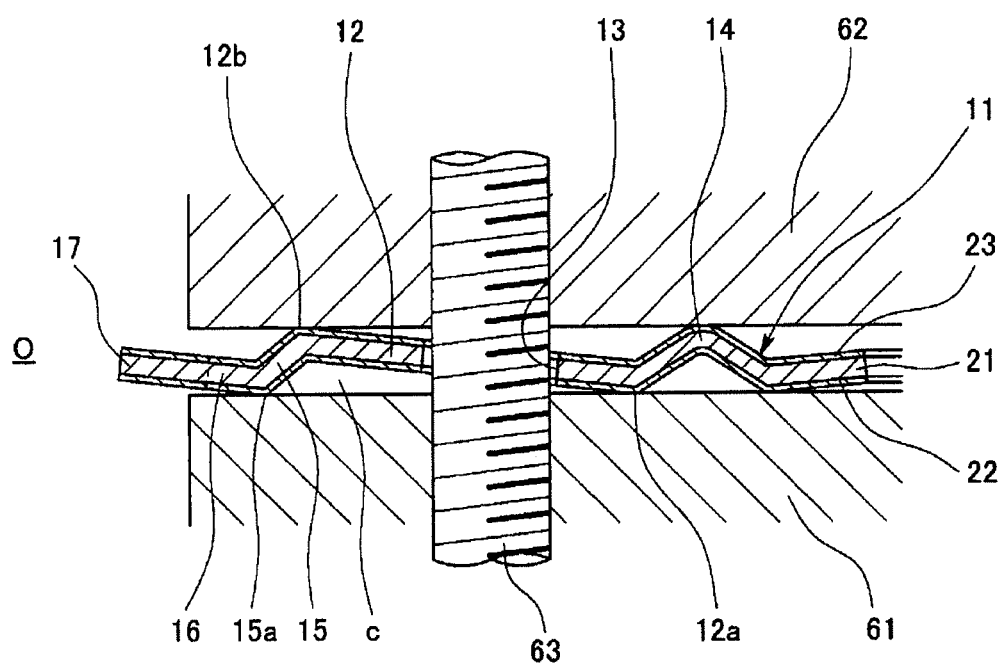
FIG. 6 is a cross-sectional view of an essential section, illustrating a state in which the gasket has been installed.

In the present embodiment, the bead section 14 has the half bead shape. Alternatively, however, the bead section 14 may have, for example, a full bead shape having an arc-shaped cross section or a trapezoidal bead shape having a trapezoidal cross section. As an example, in the metal gasket 11 illustrated in FIG. 5 and FIG. 6, the bead section 14 has the full bead shape having the arc-shaped cross section.

The gasket peripheral position where the gasket installation determination projection 17 is to be provided may be a position on the outer peripheral side of the bolt hole 13 or a position in the vicinity thereof, or a position between the bolt holes 13 that are adjacent to each other (inter-bolt-hole position).

Second Embodiment

Figure 7A:
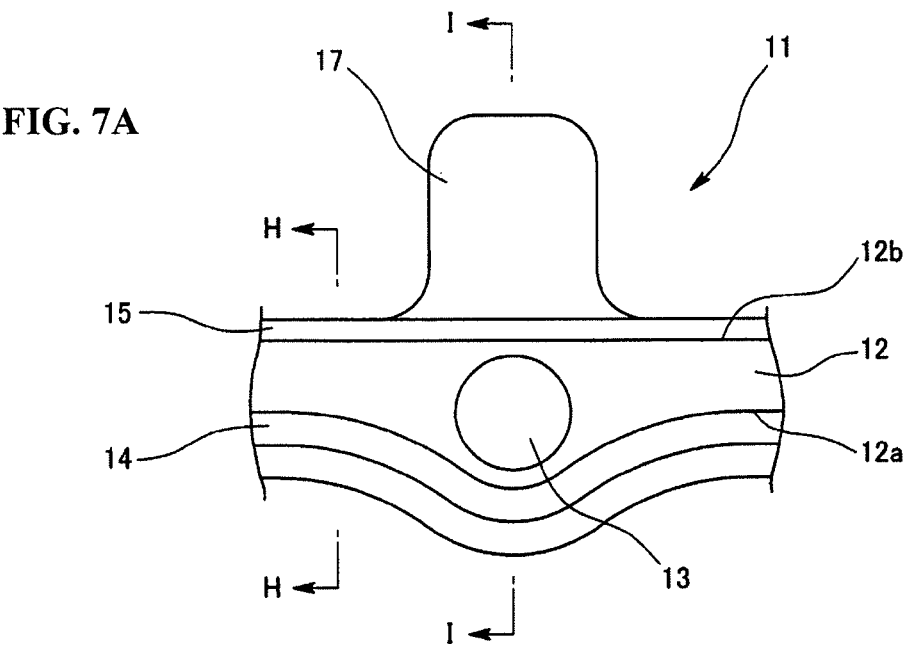
FIGS. 7A, 7B, 7C and 7D present diagrams illustrating a metal gasket according to a second embodiment of the present invention, FIG. 7A being a plan view of an essential section of the metal gasket, FIG. 7B being a cross-sectional view of the essential section of the metal gasket and an enlarged cross-sectional view thereof taken on line H-H in FIG. 7A, FIG. 7C being a cross-sectional view of the essential section of the metal gasket and an enlarged cross-sectional view thereof taken on line I-I in FIG. 7A, and FIG. 7D being a cross-sectional view of an essential section of another example of the gasket installation determination projection provided on the gasket.
Figures 7B, 7C, 7D:
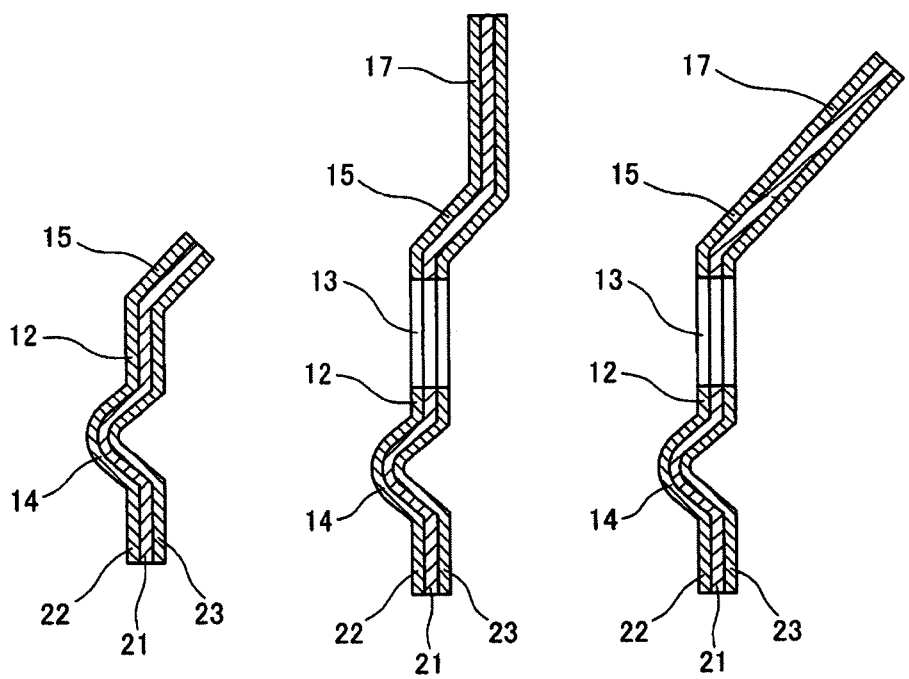
Figure 8A:
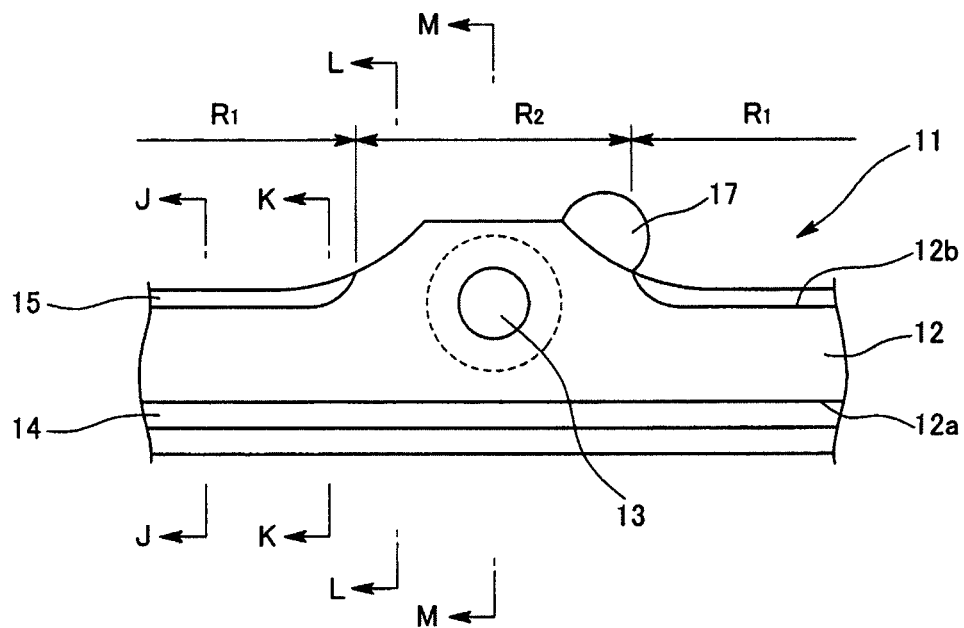
FIGS. 8A, 8B, 8C, 8D and 8E present presents diagrams illustrating a metal gasket according to a third embodiment of the present invention, FIG. 8A being a plan view of an essential section of the metal gasket, FIG. 8B being a cross-sectional view of the essential section of the metal gasket and an enlarged cross-sectional view thereof taken on line J-J in FIG. 8A, FIG. 8C being a cross-sectional view of the essential section of the metal gasket and an enlarged cross-sectional view thereof taken on line K-K in FIG. 8A, FIG. 8D being a cross-sectional view of the essential section thereof and an enlarged cross-sectional view taken on line L-L in FIG. 8A, and FIG. 8E being a cross-sectional view of the essential section thereof and an enlarged cross-sectional view taken on line M-M in FIG. 8A.
Figure 8B:
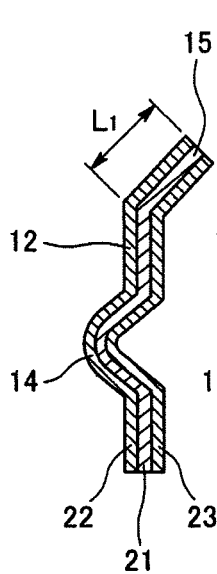
Figure 8C:
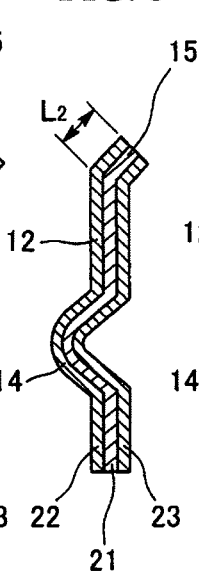
Figure 8D:
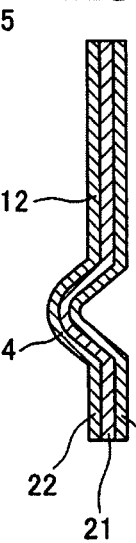
Figure 8E:
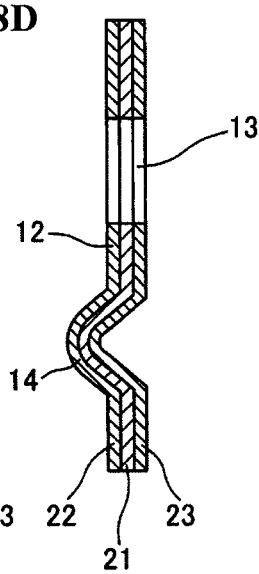
Figure 10A:
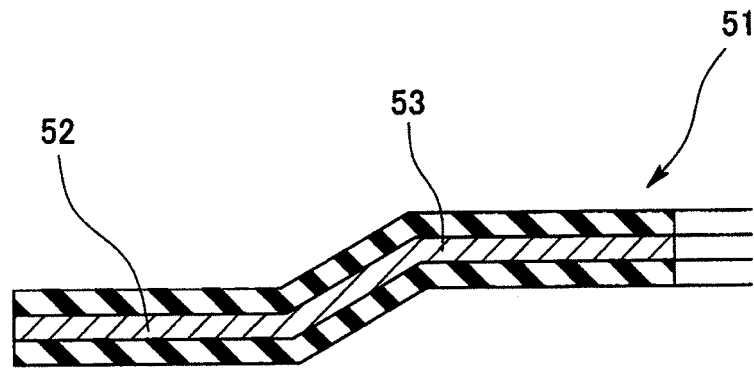
FIGS. 10A and 10B present diagrams illustrating a metal gasket according to a conventional art, FIG. 10A being a cross-sectional view of an essential section of the gasket, and FIG. 10B being a cross-sectional view illustrating the essential section in a state in which the gasket has been installed.
Figure 10B:
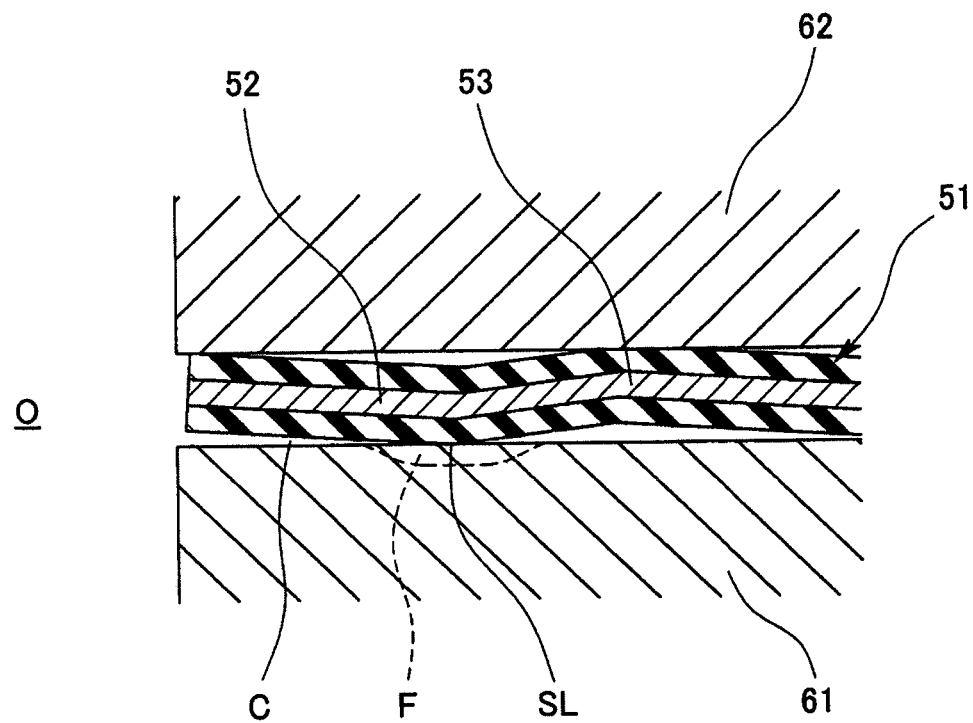

As illustrated in FIGS. 7(A), 7(B), and 7(C), a metal gasket 11 according to the present embodiment includes a straight section 12 provided with, in a plane, a predetermined number of bolt holes 13, in which assembly bolts are to be inserted, a bead section 14 having a full bead shape is formed integrally with an inner peripheral edge 12a of the straight section 12, and a bent section 15 having a skirt-like shape is formed integrally with an outer peripheral edge 12b of the straight section 12. The bead section 14 having the full bead shape is provided such that the bead section 14 projects toward one side in the direction of the gasket thickness, and the bent section 15 is provided aslant toward the other side in the direction of the gasket thickness. These straight section 12, the bead section 14, and the bent section 15 are all provided along the entire periphery of the gasket 11.

Further, a gasket installation determination projection 17, which is a part of the periphery, is formed integrally with the outer peripheral edge of the bent section 15. The gasket installation determination projection 17 is provided as a projection shaped like a flat tongue piece on the outer peripheral side of the bolt hole 13. Further, the gasket installation determination projection 17 is provided as a projection parallel to the straight section 12; alternatively, however, the gasket installation determination projection 17 may be provided as a projection parallel to the bent section 15, as illustrated in FIG. 7(D). The bead section 14 may be provided as a bead section having a half bead shape.

Third Embodiment

As illustrated in the drawings of FIG. 8, a metal gasket 11 according to the present embodiment includes a straight section 12 provided with, in a plane, a predetermined number of bolt holes 13, in which assembly bolts are to be inserted. A bead section 14 having a full bead shape is formed integrally with an inner peripheral edge 12a of the straight section 12, and a bent section 15 having a skirt-like shape is formed integrally with an outer peripheral edge 12b of the straight section 12. The bead section 14 having a full bead shape is provided such that the bead section 14 projects toward one side in the direction of the gasket thickness, and the bent section 15 is provided aslant toward the other side in the direction of the gasket thickness. The straight section 12 and the bead section 14 are provided along the entire periphery of the gasket 11, whereas the bent section 15 is provided on a part of the periphery of the outer peripheral edge of the straight section 12, thus providing the outer peripheral edge of the metal gasket 11 with an area $R_1$, where the bent section 15 is provided, and an area $R_2$, where the bent section 15 is not provided.

The bent section 15 has a shape of gradational change, in which, at the end part of the area $R_1$, where the bent section 15 is provided, the length thereof gradually decreases toward the area $R_2$, where the bent section 15 is not provided ($L_1 > L_2$). This arrangement makes it possible to gently change the contact surface pressure applied to the housings. The length of the bent section 15 ideally ranges from about 0.3 mm to about 5 mm (if the length of the bent section 15 is below 0.3 mm, then the compressibility of the bent section 15 may be significantly degraded, leading to a large loss of a bolt axial force).

The area $R_2$, where the bent section 15 is not provided, is provided at a position in the vicinity of the bolt hole 13. At a position in the vicinity of the bolt hole 13, a high surface pressure arises due to the high rigidity of a bolt seating surface. Therefore, even if the bent section 15 is not provided at a position in the vicinity of the bolt hole 13, the place where the high surface pressure takes place will substitute for the bent section 15.

Further, the gasket installation determination projection 17, which is a part of the periphery, is integrally formed in the area $R_2$, where the bent section 15 is not provided. The gasket installation determination projection 17 is provided as a projection shaped like a flat tongue piece at a position in the vicinity of the outer peripheral side of the bolt hole 13. Further, the gasket installation determination projection 17 is provided as a projection parallel to the straight section 12; alternatively, however, the gasket installation determination projection 17 may be provided as a projection parallel to the bent section 15.

Still further, the bead section 14 may be provided as a bead section having a half bead shape, as illustrated in the drawings of FIG. 9.

In the embodiments described above also, providing the bent section 15 makes it possible to restrain the sealing function from being degraded due to the occurrence of the crevice corrosion in the housings, and providing the gasket installation determination projection 17 enables the gasket to have the gasket installation determination function.

DESCRIPTION OF REFERENCE NUMERALS

11 metal gasket
12 straight section
12*a* inner peripheral edge
12*b*, 15*a* outer peripheral edge
13 bolt hole
14 bead section
15 bent section
16 second straight section
17 gasket installation determination projection
21 metal plate
22, 23 rubber layer
61, 62 housing
63 assembly bolt

What is claimed is:

1. A metal gasket to be sandwiched between a pair of housings, comprising:
   a first straight section provided with a bolt hole;
   a bead section formed by being raised from an inner peripheral edge of the first straight section tow and one side in a gasket thickness direction; and
   a bent section formed by being bent from an outer peripheral edge of the first straight section toward the other side in the gasket thickness direction, the bent section having a constant length from the outer peripheral edge of the first straight section along an entire periphery of the gasket; and
   a second straight section integrally formed on an outer peripheral side of the bent section, wherein the second straight section extends parallel to the first straight section and has a constant length from the outer peripheral edge of the bent section along the entire periphery of the gasket,
   wherein, in the case where the metal gasket is compressively sandwiched by the pair of housings, the bead section elastically deforms such that the height thereof decreases and the first straight section also elastically deforms, and at this time, the inner peripheral edge of the first straight section comes in contact with one of the housings, the outer peripheral edge of the first straight section comes in contact with the other housing, and the bent section comes in contact with the one of the housings, and
   a gasket installation determination projection, which is a part of a periphery, is provided only on a part of the periphery of the gasket, the gasket installation determination projection extends outwardly from an outer periphery side of the second straight section and is oriented in a same plane as the second straight section.

2. The metal gasket according to claim 1,
   wherein the gasket installation determination projection is provided at a position on the outer peripheral side of the bolt hole or at a position in the vicinity thereof.

3. The metal gasket according to claim 1, further comprising the bolt hole being among a plurality of bolt holes, and
   wherein the gasket installation determination projection is provided at a position between adjacent ones of the plurality of bolt holes.

4. The metal gasket according to claim 1,
   wherein the metal gasket is a laminated type metal gasket in which a rubber layer is deposited on a surface of a metal plate.

5. The metal gasket according to claim 2,
   wherein the metal gasket is a laminated type metal gasket in which a rubber layer is deposited on a surface of a metal plate.

6. The metal gasket according to claim 3,
   wherein the metal gasket is a laminated type metal gasket in which a rubber layer is deposited on a surface of a metal plate.

7. The metal gasket according to claim 1, wherein both of a fixed end and a free end of the gasket installation determination projection is positioned radially outward of the bolt hole with respect to a center of the bolt hole.

* * * * *